United States Patent [19]

Stansfield et al.

[11] Patent Number: 4,924,388
[45] Date of Patent: May 8, 1990

[54] IMAGE MOVEMENT PROCESSING FOR PAGE PLANNING

[75] Inventors: Peter W. Stansfield, Hertfordshire; Alastair Reed, Bedfordshire, both of England

[73] Assignee: Crosfield Electronics Limited, London, England

[21] Appl. No.: 140,847

[22] Filed: Jan. 5, 1988

[30] Foreign Application Priority Data

Jan. 5, 1987 [GB] United Kingdom .................. 8700092

[51] Int. Cl.⁵ .............................................. G01R 33/20
[52] U.S. Cl. ............................ 364/413.2; 364/413.16; 364/413.22; 364/518
[58] Field of Search ................... 364/518, 521, 413.13, 364/413.14, 413.16, 413.19, 413.2, 413.22; 340/724, 723; 358/138; 324/309, 308; 378/4, 901

[56] References Cited

U.S. PATENT DOCUMENTS

| | | | |
|---|---|---|---|
| 4,288,816 | 9/1981 | Kashioka et al. | 358/138 X |
| 4,581,582 | 4/1986 | Redington | 324/309 |
| 4,716,368 | 12/1987 | Haacke | 324/309 |
| 4,812,983 | 3/1989 | Gullberg et al. | 378/901 X |

OTHER PUBLICATIONS

"Unifying VLSI Array Designs with Geometric Transformations", Peter R. Cappello et al, 1983 IEEE.

*Primary Examiner*—Gary V. Harkcom
*Assistant Examiner*—Mark K. Zimmerman
*Attorney, Agent, or Firm*—Sughrue, Mion, Zinn, Macpeak & Seas

[57] ABSTRACT

Apparatus for modifying part of an image represented digitally in the frequency domain comprises a first memory for storing a representation of the image digitally in the frequency domain as at least one first block of data locations containing frequency coefficient data. A second memory is provided for storing a representation of the image part in the frequency domain by second blocks of data locations containing frequency coefficient data, the first and second blocks representing, after conversion to the spatial domain, spatially shifted versions of the image part relative to a fixed spatial co-ordinate system. A suitably programmed computer applies a predetermined shift function defined in the frequency domain to the (or each) first block of data stored in the first memory to generate the (or each) second block, and stores the resultant second blocks of data in the second memory.

7 Claims, 2 Drawing Sheets

IMAGE MOVEMENT PROCESSING FOR PAGE PLANNING

FIELD OF THE INVENTION

The invention relates to methods and apparatus for moving an image relatively to a fixed coordinate system. The invention is particularly applicable to the movement of images relatively to one another in page planning systems.

DESCRIPTION OF THE PRIOR ART

In conventional page planning systems, images are defined digitally as a number of arrays of pixels, data for each pixel defining the colour content of that pixel. Typically, for a coloured image, the colour content of a pixel will be defined in terms of the density of its different colour components (e.g. cyan, magenta, yellow, and black) so that there are four arrays of data for each image. The page planning process involves determining the coordinates of each image on a final page and then copying from respective stores into each pixel of the final page data from the pixel of an image which is to be located at that position.

Current image processing systems are able to define images at high resolutions of the order of 320×320 pixels per square inch. Although this is particularly advantageous in accurately defining an image, it leads to the generation of a very large amount of data defining the content of each image. This leads to a particular problem when it is necessary to store the data or to transmit the data. To reduce this problem, it has recently been proposed to transform the colour density data for 8×8 pixel blocks into the frequency domain. The image is represented in the frequency domain by equivalent 8×8 blocks of data locations which define respective frequency coefficents. Typically, there is a zero order frequency coefficient defining a DC term together with a number of higher order AC coefficients. By defining the image in this way, the number of higher order frequency terms required to define a reasonably accurate representation of the image is much less than 64 (the largest possible number of coefficients). This enables the image to be stored or transmitted in a much more compressed form than the original spatial representation.

When it is necessary to construct a page containing a number of images which have been compressed by conversion into the frequency domain, it has previously been necessary to decompress the images into the spatial domain and then to construct the final composite page in the manner described above. This is computationally very demanding and needs a lot of buffer space in the page planning apparatus.

SUMMARY OF THE INVENTION

In accordance with one aspect of the present invention, a method of modifying part of an image represented digitally in the frequency domain by at least one first block of data locations containing frequency coefficient data in which for each first block a second block of data locations containing frequency coefficient data is generated, the first and second blocks representing, after conversion to the spatial domain, spatially shifted versions of the image part relative to a fixed spatial coordinate system comprises applying a predetermined shift function defined in the frequency domain to the or each first block of data locations to generate the or each second block of data locations.

This invention enables the decompression of a majority of the image to be avoided during page planning operations and the like by carrying out computations in the frequency domain. In practice, it will generally be necessary to decompress from the frequency domain t the spatial domain those blocks of data locations which include an edge of the image but, in general, these (edge) blocks represent a small proportion of the total number of blocks in an image. For example, if the image is formed by 800×800 pixels and is divided into 8×8 blocks, there will be 400 edge blocks compared with nearly 10,000 body (non-edge) blocks.

The invention is based on the property that moving or shifting an image in the spatial domain relative to a fixed coordinate system corresponds in the frequency domain to simple multiplication by a filter shift function. Typically, after application of the shift function, each data location is modified to define a coefficient of a frequency different from the frequency whose coefficient was originally defined by the data location.

Typically, the image part will be represented by a plurality of subsidiary blocks, the method comprising a preliminary step of forming one or more first blocks by combining groups of the subsidiary blocks. The combination of blocks of data in the frequency domain can be achieved in a variety of ways but one particularly convenient method is described in "Direct Computation of Higher-Order DCT Coefficients From Lower-Order DCT Coefficients" by B G Kashef and A Habibi, pages 425–431 of SPIE Vol 504 Applications of Digital Image Processing VII (1984). The advantage of combining the subsidiary blocks, which in one example are defined by 8×8 data locations, is that the number of computational steps can be reduced.

In some examples, the shift function may comprise a two dimensional shift function but in the case where the image part is defined by an orthogonal array of first blocks of data locations, it is convenient to define the shift function by a single one dimensional shift function which is applied one or more times in each of the orthogonal directions.

In one example the method comprises (a) applying the predetermined shift function to each first block of data locations to generate modified blocks in which the content of each data location is modified;

(b) determining the data locations in the modified first blocks which contribute to the content of each second block of data locations; and (c) for each said second block which does not define an edge of the shifted image summing the coefficients of each frequency as defined by the content of those data locations of the modified first blocks which are determined to contribute to said second block to generate resultant coefficients for each frequency, and storing the resultant coefficients in respective data locations of the second block.

Preferably, the inverse transform of the shift function comprises a one or two dimensional delta function. This shift function in the frequency domain causes a simple phase shift of the frequencies within each block of data locations by suitably modifying the stored coefficients. The exact form of the shift function is predetermined in accordance with the degree of movement required.

It should be understood that each "first block" will generally form one of a number of first blocks of the same size each defining a respective colour component of the image in the frequency domain. Furthermore, each first block may be represented by two equivalent blocks where the transformation from the spatial domain to the frequency domain results in the generation of real and imaginary components. An example of such a transformation is a Fourier transformation. Other transformations such as a cosine transformation result only in real coefficients. The shift function is chosen to correspond with the appropriate transform function so as to have real and imaginary parts or a real part only as appropriate.

The original blocks may have the same shape or could differ in shape.

The invention is particularly applicable for use in page planning methods in which the second blocks are defined in an array of blocks some of which define other images, the complete array defining a composite page.

In accordance with a second aspect of the present invention, apparatus for modifying part of an image represented digitally in the frequency domain comprises a first memory for storing a representation of the image digitally in the frequency domain as at least one first block of data locations containing frequency coefficient data; a second memory for storing a representation of the image part in the frequency domain by second blocks of data locations containing frequency coefficient data, the first and second blocks representing, after conversion to the spatial domain, spatially shifted versions of the image part relative to a fixed spatial coordinate system; and processing means for applying a predetermined shift function defined in the frequency domain to the or each first block of data stored in the first memory to generate the or each second block, and for storing the resultant second blocks of data in the second memory.

The first and second memories may comprise separate hardware components or different parts of a common memory.

Typically, the processing means comprises a suitably programmed computer.

BRIEF DESCRIPTION OF THE DRAWINGS

Examples of a page planning apparatus and methods in accordance with the present invention will now be described with reference to the accompanying drawings, in which.

DETAILED DESCRIPTION OF THE EMBODIMENTS

Figure 1:
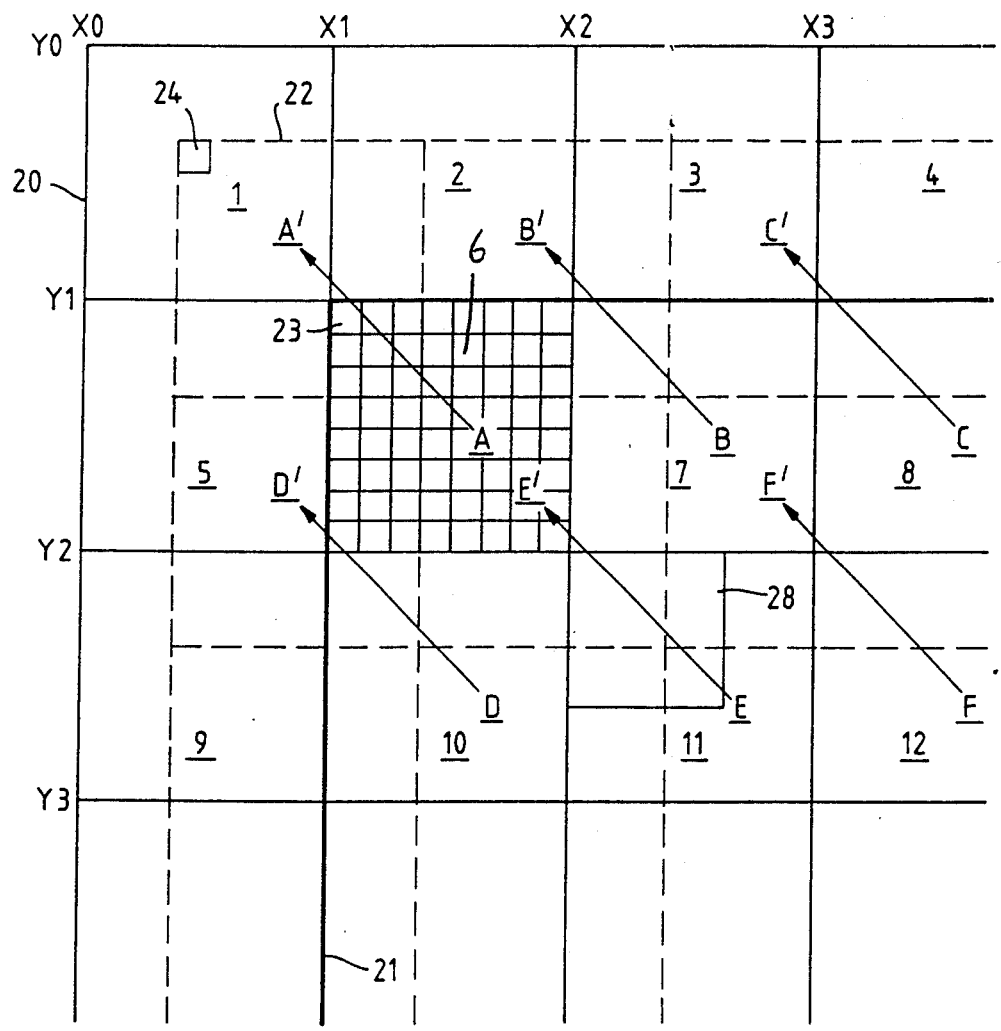
FIG. 1 illustrates portions of two images which are to be positioned on the same page and, in phantom, indicates the final position of the second image relatively to the first image.

In a typical page planning operation, a number of images are stored separately in digital form ready to be combined into a composite page. Each image is defined by a large number of pixels, the digital content of each pixel defining its colour content. For example, in the case of a coloured image, each pixel will be defined by three or four digital values representing the colour component densities (e.g. cyan, magenta, yellow, and black). In view of the large amount of data this requires to be stored and the consequent large size for suitable memories, it is common practice to transform this data defining the images in the spatial domain into data defining the images in the frequency domain. To achieve this transformation, each image is divided into blocks of pixels, typically 8×8 pixels. FIG. 1 illustrates part of a first image 20 defined by a primary array of 8×8 pixel blocks labelled 1-12. These blocks are positioned in a first array having boundaries at coordinate positions X0-X3, Y0-Y3 etc of a fixed spatial coordinate system.

A second image 21 is also defined by an array of 8×8 pixel blocks labelled A-F in FIG. 1. These two images may be stored in separate parts of a common memory or in separate memories (as will be described below). The spatial location of boundaries of the blocks of each image lie, in this simple example, on the same lines and it will be seen that the top left hand corner of image 21 is positioned at coordinates X1, Y1.

In the frequency domain, the colour content of each block of pixels is defined by corresponding blocks of data locations in terms of a single (or two where the transform leads to real and imaginary parts) DC coefficient and a number of AC coefficents for each higher order frequency. The coefficients are arranged in the same order in each block. It should be understood that there is one set of these components for each colour separation. In the frequency domain, a majority of the significant data defining the content of the 8×8 pixel block is contained in the first few coefficients. It is therefore possible to set to zero several of the higher order coefficients without losing significant image detail and this leads to a significant degree of compression of the data.

In this example, it is desired to shift image 21 relative to image 20 so that image 21 partially overlaps the pixel blocks 1-5 and 9 of image 20. The resultant position of image 21 after this shift is indicated by a dashed line 22.

In the past, a shift of this type has necessitated converting the representations of the images from the frequency domain to the spatial domain and then replacing each relevant pixel in an image 20 pixel block by the corresponding pixel from image 21. In the example shown in FIG. 1, it is desired to move image 21 5 pixels in the Y direction and 5 pixels in the X direction so that the pixel blocks A-F are positioned at locations A'-F' defining a secondary array offset from the primary array. In a typical conventional shift operation, the data from pixel 23 is inserted into pixel 24 of pixel block 1 of image 20. This is repeated for each pixel in image 2 to generate a resultant composite page defined in terms of image 20 blocks which, if necessary can then be reconverted into the frequency domain.

The inventors have recognised that although the conventional process of pixel replacement in the spatial domain may still be necessary for those blocks of the primary array which are to contain an edge of image 21, it is possible considerably to simplify the process for those blocks of the primary array which, after the shift, contain solely portions of image 21. An example of such a block is the block 6. It will be seen from FIG. 1 that after the required shift of image 21, block 6 of the first array contains 9 pixels (including pixel 23) from original block A, 15 pixels from original block B, 15 pixels from original block D, and 25 pixels from original block E. The inventors have found that the resultant content of block A can be determined from the representation of image 21 in the frequency domain without the intermediate step of converting this information back into the spatial domain.

Figure 2A:
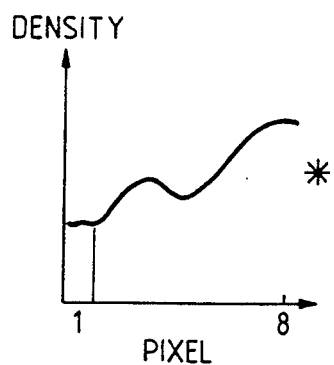
FIGS. 2A–2C illustrate graphically the application of a shift function, in the spatial domain to the second image.
Figure 2B:
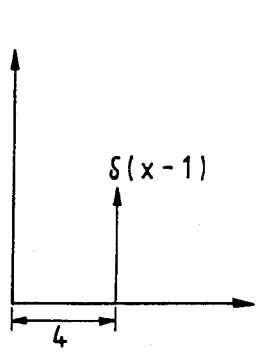
Figure 2C:
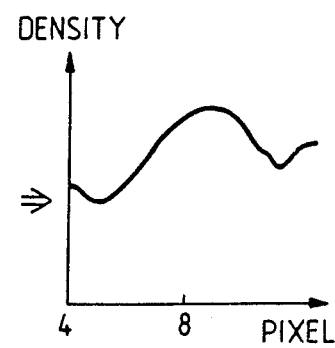
Figure 3A:
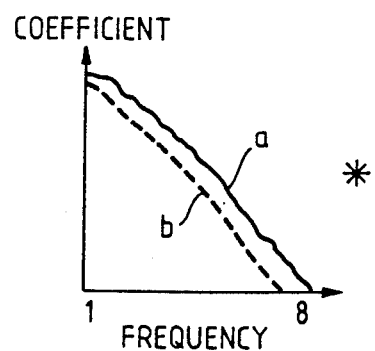
FIGS. 3A and 3B illustrate graphically part of the image and the shift function of FIGS. 2A and 2B in the frequency domain.
Figure 3B:
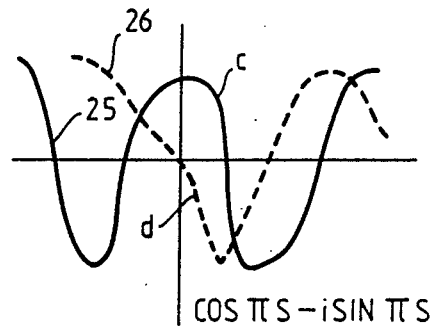

The shift of a block of image 21 can be considered in one dimension to be the convolution of a function defining the block (FIG. 2A) with a delta function (FIG. 2B) yielding a shifted block function (FIG. 2C). In the frequency domain, convolution is equivalent to muliplication so that this shift is equivalent to the multiplication of a frequency function (having real and imaginary parts a, b) defining the block (FIG. 3A) by the transform of a delta function (FIG. 3B having real and imaginary parts c, d) to yield a shifted frequency function. This function has the form:

$$\frac{\cos \pi s + \sin \pi s}{(1 - k/s)} + i \frac{(\cos \pi s - \sin \pi s)}{(1 - k/s)}$$

Although the blocks of data locations are two dimensional, the application of the shift function can be carried out in a series of one dimensional multiplication steps due to the separable nature of the transformed data. Where a Fourier transform is used to convert the data from the spatial to the frequency domain, the data will have both real and imaginary components and thus the transformed delta function will also have real and imaginary components 25, 26 which multiply the real and imaginary components of the block function. In the case of some other transforms, such as a cosine transform, only a real component is generated and so the transform of the delta function will only be a real function.

In one example, the shift function is applied to each 8×8 "body" block. After application of the shift function in the frequency domain (i.e. multiplication by the shift function) the content of the data locations of each body block of image 21 has been modified (unless it was previously zero).

It is then necessary to determine for each new block of the primary array defining the shifted image 21 which data locations are needed to define the block. As previously mentioned, the block 6, after image 21 has been shifted, is made up by contributions from blocks A, B, D, and E of image 21. Thus, the 5×5 block of data locations 27 within block 6 correspond to the 5×5 block of data locations 28 in block E of image 21 after modification by the shift function.

Since some of the data contained within the data locations making up new block 6 will relate to the same frequencies, the next step is to sum those data values relating to the same frequencies to define a new set of coefficients, one for each frequency. Conventionally, these coefficients are then stored in the data locations of new block 6 in a similar manner to the arrangement of the original coefficients.

It should be understood that this process is repeated for each colour component.

For the (edge) blocks of the primary array which will contain edges of the second image 21 after shifting, the content is determined in a conventional manner by converting the blocks concerned into the spatial domain.

Figure 4:
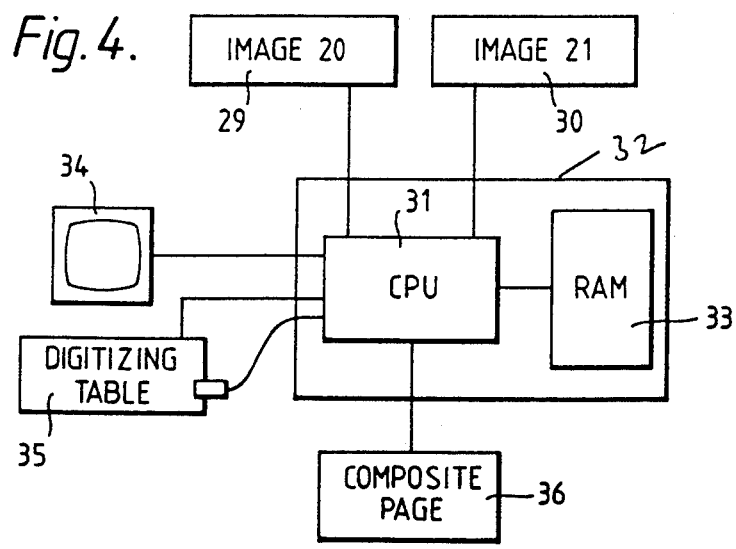
FIG. 4 is a block diagram of the apparatus.

FIG. 4 illustrates schematically apparatus for carrying out the method described. The two images to be combined are stored in respective stores 29, 30. The image information, in the frequency domain, may have been generated by scanning original images using, for example, our Magnascan 600 series scanner to generate initial representations of the images in the spatial domain. These spatial representations may then have been converted into the frequency domain by for example applying one dimensional fast Fourier transforms. Data from the stores 29, 30 is accessed by a microprocessor 31 within a page planning unit 32. The microprocessor 31 is associated with a RAM 33. The microprocessor 31 is also connected with a monitor 34 and a conventional digitising table 35. Resultant data from the microprocessor 31 defining the composite page in terms of the primary array is stored in a memory 36.

In operation, the user views on the monitor 34 representations of the images stored in stores 29, 30 and determines the required relative positions that these images should have on the finished page. These positions are notified to the microprocessor 31 in a conventional manner via the digitising table 35. These may be defined, for example, by indicating the required shift for image 21 relative to image 20. The microprocessor 31 then determines which of the blocks of data locations defining image 21 can be modified in the frequency domain by simple application of a suitable shift function and thereafter modifies that data and stores the modified data in the RAM 33. The microprocessor 31 then loads each block of data locations in the composite page memory 36 equivalent to blocks 1-12 etc of the primary array with appropriate digital data selected either from the memory 29 or the memory 33 except for those blocks of the primary array which contain an edge of the image 21. For those blocks, the data defining the relevant portions of the images 20 and 21 are converted into the spatial domain and a new composite block in the spatial domain is generated which is then converted back into the frequency domain and stored in the memory 36.

In a second method, the image 21 is initially redefined in the frequency domain in terms of a number of larger first blocks, each containing a number of the original blocks. For example, initially the blocks defined in the column between coordinates X2, X3, starting with block E are combined into a single first block having dimensions 8× (8×n) where n is the number of blocks in the column. This coalescing may be achieved by any conventional method as for example described in the paper mentioned above. A one dimensional shift function is then applied to each of the first blocks and the modified data is stored representing a shift in the Y direction of each column of blocks. The shifted columns are then redefined in terms of original block sizes (i.e. 8×8 blocks of data locations) and a new series of first blocks extending in the horizontal direction (as seen in FIG. 1) are defined. For example a typical set of blocks will comprise those between coordinate positions Y2, Y3 and starting with block E. Once again, a one dimensional shift function is applied to each horizontal row of these new first blocks resulting in modified data defining the row shifted in the X direction. The shifted rows are then converted back into 8×8 blocks. The edge blocks of the image 21 are handled in the spatial domain as before.

Figure 5:
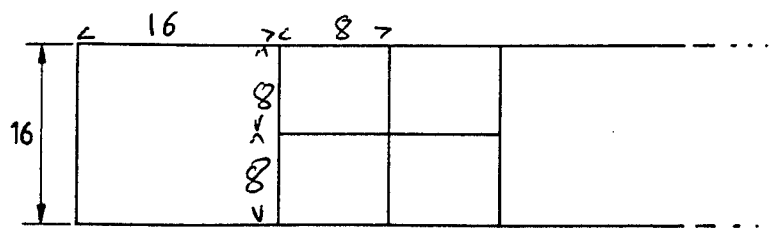
FIG. 5 illustrates a first block of data locations made up from a number of subsidiary blocks of different sizes.

In some circumstances, the blocks defining the image 21 may have different sizes as for example shown in FIG. 5 which illustrates a row of blocks, the first of which has dimensions 16×16 pixels and the next of which have sizes 8×8 pixels and so on. When the second form of the method described above is to be carried out, the rows and columns of first blocks which are generated must have a transverse dimension sufficient to encompass the largest block size. In the FIG. 5 example, this transverse dimension will be 16 data locations.

We claim:

1. An apparatus implemented method of modifying part of a first image, represented digitally in a frequency domain by at least one first block of data locations containing frequency coefficient data, to produce a second image, in which, for each said first block, a second block of data locations containing frequency coefficient data is generated, said first and second blocks representing, after conversion to a spatial domain, spatially shifted versions of said part of said first image relative to a fixed spatial coordinate system, the method comprising:

(a) applying a predetermined shift function defined in the frequency domain to each said first block of data locations to generate modified blocks in which the content of each data location is modified;

(b) determining the data locations in said modified first block which contribute to the content of each said second block of data locations;

(c) for each said second block which does not define an edge of the shifted image, summing the coefficient of each frequency as defined by the content of those data locations of the modified first blocks which are determined to contribute to said second block to generate resultant coefficients for each frequency, and storing the resultant coefficients in respective data locations of the second block; and (d) producing said second image in accordance with said steps (a)-(c).

2. A method according to claim 1, wherein said image part is defined by an orthogonal array of first blocks of data locations, said step of applying a shift function comprising applying a single one dimensional shift function at least once in each of the orthogonal directions.

3. A method according to claim 2, wherein an inverse transform of said shift function comprises a delta function.

4. A method according to claim 1, wherein said first blocks have identical dimensions.

5. Apparatus for modifying part of a first image, represented digitally in a frequency domain, to produce a second image, the apparatus comprising:

a first memory for storing a representation of said first image digitally in the frequency domain as at least one first block of data locations containing frequency coefficient data;

a second memory for storing a representation of said part of said first image in the frequency domain by second blocks of data locations containing frequency coefficient data, said first and second blocks representing, after conversion to a spatial domain, spatially shifted versions of said part of said first image relative to a fixed spatial coordinate system;

means for applying a predetermined shift function defined in the frequency domain to said first blocks of data stored in the first memory to generate modified blocks in which the content of each data location is modified;

means for determining the data locations in said modified first blocks which contribute to the content of each said second block of data locations;

means, responsive to an identification of each said second block which does not define an edge of the shifted image, for summing the coefficients of each frequency as defined by the content of those data locations of the modified first blocks which are determined to contribute to said second block to generate resultant coefficients for each frequency, and for storing the resultant coefficients in respective data locations of the second block;

means for storing generated second blocks of data in said second memory; and means, responsive to said means for applying, said means for determining, and said means for summing, for producing said second image.

6. Apparatus according to claim 5, wherein said processing means comprises a programmed computer.

7. A computer programmed to modify part of a first image, represented digitally in a frequency domain by at least one first block of data locations containing frequency coefficient data in which, for each said first block, a second block of data locations containing frequency coefficient data is generated, said first and second blocks representing, after conversion to a spatial domain, spatially shifted versions of said image part relative to a fixed spatial coordinate system, said computer producing a second image accordingly, and including:

means for applying a predetermined shift function defined in the frequency domain to said first blocks of data to generate modified blocks in which the content of each data location is modified;

means for determining the data locations in said modified first blocks which contribute to the content of each said second block of data locations;

means, responsive to an identification of each said second block which does not define an edge of the shifted image, for summing the coefficients of each frequency as defined by the content of those data locations of the modified first blocks which are determined to contribute to said second block to generate resultant coefficients for each frequency, and for storing the resultant coefficients in respective data locations of the second block; and means, responsive to said means for applying, said means for determining, and said means for summing, for producing said second image.

* * * * *